Dec. 14, 1965 SHIRO SASAKI 3,223,920

NOISE SUPPRESSING TRANSFORMER

Filed Dec. 21, 1961

Inventor
Shiro Sasaki by Hill, Sherman, Meroni, Gross & Simpson Attys.

United States Patent Office 3,223,920
Patented Dec. 14, 1965

3,223,920
NOISE SUPPRESSING TRANSFORMER
Shiro Sasaki, 35 Nakasugiyama-tori, Sendai-shi, Japan
Filed Dec. 21, 1961, Ser. No. 161,206
Claims priority, application Japan, Jan. 9, 1961, 36/529
3 Claims. (Cl. 323—44)

This invention relates to a transformer and more particularly to a transformer which will compensate for the deterioration of frequency response of the noise suppressing characteristics of another main transformer so that the latter has favorable frequency characteristics over a wide noise suppressing range when used in an electrical circuit.

It is well known that the noise suppressing characteristics of an ordinary transformer deteriorate chiefly due to the distributed capacitance and leakage inductance between its adjacent windings as the frequency of the current approaches the upper frequency limit of the transformer.

One object of this invention is to provide a transformer which compensates another transformer's characteristics in such a way that the latter has a wider noise suppression frequency band.

A further object of this invention is to provide a transformer which cooperates with a video transformer to obtain a transformer device capable of transforming television signals free of external noise generated in a wide frequency band ranging from about 20 cycles per second to 9 megacycles per second.

A still further object of this invention is to provide a transformer which enables an audio transformer to obtain a noise suppression characteristic with a high frequency range up to about three times the upper limit frequency for the transformer, for example, up to 80 kilocycles per second.

Other objects, features and advantages of this invention will become fully apparent from the following description taken in conjunction with the accompanying drawings, in which.

Before entering into the description of this invention, I will explain the noise suppressing problems encountered when using a transformer terminated transmission line for electrical communication such as a video frequency transmission line.

Video transmission lines are often placed underground or above ground in places where they are likely to be affected by ground currents, atmospheric disturbances or electromagnetic fields of other electric equipment such as electric railways and power lines. The spurious radiations generate noise currents in the transmission lines which, unless filtered out, affect the quality of the signal. The distinguishing characteristic of these noise currents is that, unlike signal currents, they flow in the same direction in all of the conductors of the transmission line. Consider for the moment a signal current transmitted along a two-wire transmission line connected to the terminals 5 and 8 of FIGURE 2. The electric field conditions around the transmission line are satisfied because at the moment a signal current in the wire connected to terminal 5 flows towards the right, and equal and opposite current in the wire connected to the terminal 8 flows to the left such that there is zero electromagnetic field existing around the transmission line due to the signal currents. If for some reason the electromagnetic field around the transmission line is not zero, then in order to satisfy the field conditions, there must be an unbalanced current flowing in the transmission line such that at the moment a current in the wire connected to terminal 5 is flowing towards the right, another current flowing in the wire connected to terminal 8 is also flowing towards the right. The transmission line then appears to be a single conductor carrying a current equal to the sum of the noise currents flowing in the same direction in its conductors. Because of leakage, stray and winding capacitance and other causes, these noise currents couple through the transformer terminating the transmission line and produce noise currents in the circuits connected to the secondary of the terminating transformer. While it is true that the transformer, by its nature, tends to suppress these noise currents, its capacity to do so is determined largely by other considerations in the design of the circuit.

Figure 1:
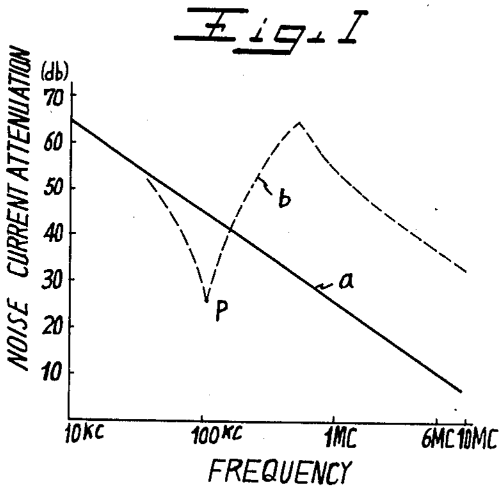
FIGURE 1 is a graph illustrating the noise current suppression characteristics as a function of frequency of a transformer and a compensated transformer device heretofore employed as shown in FIGURE 2.
Figure 2:
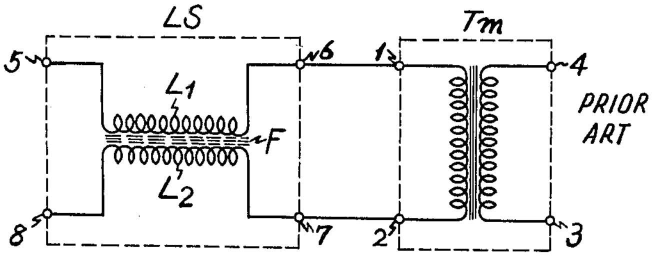
FIGURE 2 is a connection diagram for explaining a device previously used.

For example, a video transformer for television signal transmission is required to maintain a wide frequency range from 20 cycles per second to about 9 megacycles per second in order to keep the definition of images satisfactory. In order to keep the frequency characteristics satisfactory in the vicinity of 20 cycles per second, it is desired to make the inductance of the transformer as large as possible. On the other hand, for maintaining the frequency characteristics sufficient up to the high frequency band, namely up to about 9 megacycles, it is required that very tight coupling windings be used and their leakage inductance be minimized. To satisfy these two requirements, windings of the video transformer must be wound in a required number of turns with a minimum space therebetween. For this reason, it is necessary that the transformer be constructed so as to minimize the distributed capacitance of each winding. In this case, however, an undesirably large capacitance is inevitable. This distributed capacitance between the windings causes a deterioration of the noise suppressing characteristics in the high frequency range as illustrated by the noise suppression characteristic curve of the video transformer as illustrated by a curve *a* in FIGURE 1. As is apparent from the curve, this transformer shows a high noise current suppression factor of about 45 db at 100 kilocycles per second but 25 db at 1 megacycle per second. That factor lowers to about 10 db at 6 megacycles per second. This implies that earth current and other noise current generated in a video transmission line cannot be suppressed sufficiently by such a video transformer beyond a range of more than several hundred kilocycles per second. It is chiefly because of the fact that the impedance of the transformer lowers in the high frequency band owing to the distributed capacitance between the primary and secondary windings of the transformer that the noise current suppression characteristic becomes worse as the frequency applied to the transformer goes up to the high frequency band. The lowering of the impedance is generally accompanied by deterioration of characteristics due to such as, for example, the return loss and transmission loss. For preventing the noise suppressing characteristics from deteriorating as above described, a special auxiliary compensating coil having an inductance of a suitable value can be inserted in the lead lines of the terminals of the primary or secondary windings or both of the transformer. In FIGURE 2, T*m* is a main transformer, 1 and 2 are terminals of its primary winding and 3 and 4 are terminals of its secondary winding. LS is the aforementioned special auxiliary compensating coil heretofore used having the above mentioned inductance value. The auxiliary compensating coil is composed of two windings, the primary winding $L_1$ and the secondary winding $L_2$, which are closely coupled and wound on the same magnetic core F, the primary winding $L_1$ being connected across terminals 5 and 6 and the secondary winding $L_2$ being connected across the terminals 7 and 8 and both having the same inductance value. If the sense of the windings $L_1$ and $L_2$ is determined in such a way that when the main transformer T*m* and the auxiliary compensating coil LS are connected together through terminals 6 and 1 and terminals 7 and 2 then when a communicating signal current is impressed across the terminals 5 and 8 a magnetic flux generated from the winding $L_1$ and that from the winding $L_2$ owing to the current, having the same value but opposite directions, add together such that the auxiliary compensating coil LS becomes a very small direct current resistance to the transmission line. The loss caused by the compensating coil resistance is negligibly small because the auxiliary compensating coil is composed of very short windings. The noise current suppression characteristic between the terminals 5 and 8 and terminals 3 and 4 measured when the aforesaid auxiliary compensating coil LS is connected to the main transformer T*m* (in this example, a video transformer) as shown in FIGURE 2 is illustrated by a curve *b* in FIGURE 1, from which it will be seen that the high frequency noise suppressing characteristics can be improved to some degree. From this curve *b* it will also be apparent that the attenuation or suppression is 55 db at 1 megacycle per second and it becomes more than 36 db even at 6 megacycles per second, thus the high frequency noise suppressing characteristics are improved sharply. However, I have found that the noise current attenuation abruptly deteriorates at a point P in the vicinity of 100 kilocycles per second on this curve, namely a dip is caused. This means that the characteristic shown by the curve is not favorable particularly when there is a high noise level in the neighborhood of 100 kilocycles per second.

I have found that such a dip in the noise current suppression characteristic is chiefly attributed to resonance from a mutual relation between the capacitance and inductance of the main transformer T*m* and auxiliary compensating coil LS, and that this phenomenon is greatly affected by loss characteristics of the auxiliary compensating coil LS, particularly by its impedance frequency characteristics.

From my studies it has been found desirable to use a magnetic core having a high permeability $\mu$ in order that a satisfactory inductance may be maintained by the use of the auxiliary coil LSC using very short windings for improving the frequency characteristic of the transformer. For obtaining such a compensating coil having a high frequency characteristic which does not cause the dip as above described, conductor wires such as a coaxial cable, which scarcely causes high frequency loss, is wound in close coupling on such a magnetic core having a high permeability $\mu$ as above mentioned and as shown diagrammatically in FIGURE 3. The internal conductor I of the coaxial cable and external conductor E correspond respectively to the windings $L_1$ and $L_2$ in FIGURE 2 and are connected respectively to the terminals 1 and 2. Furthermore, a tertiary winding T is wound around the windings of the coaxial cable and a suitable impedance is terminated across both terminals of the tertiary winding as shown by an impedance Z in FIGURE 3. Thus the tertiary winding and the impedance Z, according to this invention, cause no losses in connection with the signal currents such as video signal currents because there is no electromagnetic field outside of the external conductor caused by such signal currents. But the tertiary winding with the terminal impedance Z inflicts a loss on the noise current, an unbalanced current, so as to suppress it effectively with a net positive or negative current flowing in and along the coaxial cable. The coaxial cable which now acts as a solid conductor becomes the primary of transformer LSC, transforming the noise current into current in the tertiary winding which flows through the impedance Z. Thus this auxiliary compensating coil LSC is referred to as a transformer in this invention. That is the transformer which is provided with the tertiary winding T having the impedance terminal Z, which can satisfactorily improve not only the high frequency noise suppression characteristic of the main transformer T but also prevent the aforementioned dip.

Figure 3:
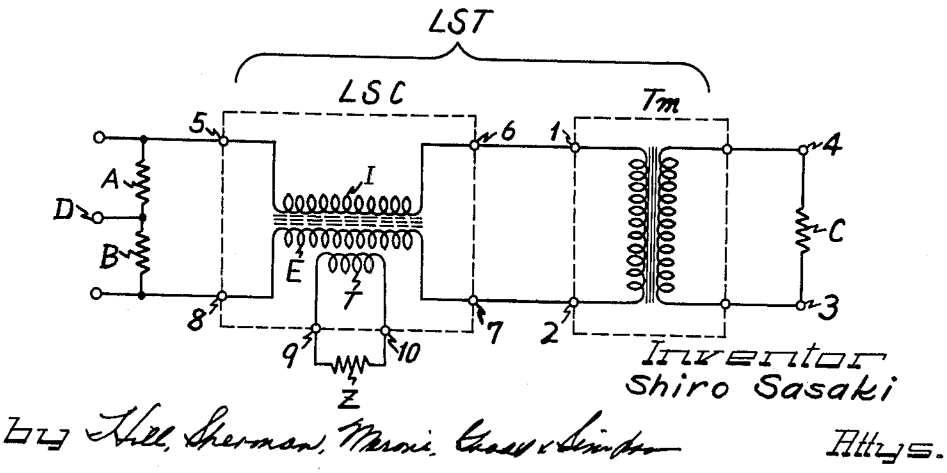
FIGURE 3 is a connection diagram showing one embodiment of the transformer device according to this invention.

In FIGURE 3 the high frequency characteristic compensating coil LSC of this invention is connected to the video main transformer T*m* with a line impedance of 75 ohms. In measurements, however, direct current resistances A and B of 75 ohms are connected in series across the primary terminals 5 and 8 of the high frequency characteristic compensating transformer LST constructed as above and another direct current resistance C of 75 ohms is terminated across the terminals 3 and 4 of the secondary coils of the transformer LST. Then a noise current voltage is measured which is picked up at both ends of the resistance C when measuring high frequency signals which are impressed across the mid-point D of the resistances A and B and the terminals 5 and 8. Numerals 9 and 10 are terminals of the tertiary winding and Z is the terminal impedance thereof. The tertiary winding mentioned here generally includes all the windings except the primary and secondary ones.

Figure 4:
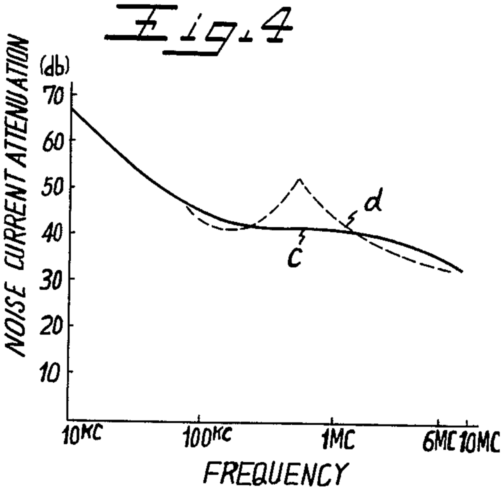
FIGURE 4 is a graph illustrating noise current suppression characteristics as a function of frequency of the device shown in FIGURE 3.

A curve in *c* in FIGURE 4 shows the noise current suppression characteristic of the compensating transformer LST of this invention when the direct current resistance Z is 2.7 kiloohms. From this curve it will be seen that the attenuation is 40 db at 1 megacycle per second and 35 db at 6 megacycles per second. The characteristic becomes flat and the undesirable dip is prevented. The resistances A and B, however, are dispensed with when actually used in a transmission line.

The outline of this invention has been described above with reference to an embodiment thereof. I have also found that noises of a desired frequency can be suppressed by selecting the above impedance Z properly such that it has a low impedance at the frequency of the noise which is to be suppressed. Various tuned circuits well known in the art can be used. Accordingly the terminals 9 and 10 of the tertiary winding are mounted outside a case. A suitable impedance Z determined in accordance with noises and an unbalanced current characteristic of the working circuit is then connected to the terminals 9 and 10 and the noise current can be selectively suppressed. Accordingly the device of this invention is very advantageous from a practical point of view.

The curve *d* in FIGURE 4 illustrates the noise current suppression characteristic of one example of this invention. It is apparent from the curve that this transformer can be tuned to suppress noise at a frequency of 600 kilocycles per second.

Although I have exemplified the coaxial cable as the windings of the auxiliary compensating coil LSC in the above description, it is of course possible to use parallel wires which are wound, as the primary and secondary windings, closely coupled with each other and which have small distributed capacitance for the working frequency band or to use a video-pair cable and other suitable windings. As the magnetic core of the auxiliary compensating coil LSC ferrite is desirable as having very high permeability $\mu$ in the high frequency range, but in some cases permalloy can also be employed as it has superior characteristics in a lower frequency band.

The above description has been taken in conjunction mainly with the noise current suppression characteristic of the high frequency characteristic compensating coil LSC of this invention but with this high frequency characteristic compensating coil, various characteristics of other ordinary transformers can be improved.

As is apparent from the preceding descriptions, by the use of the compensating coil LSC of this invention which is small in size and inexpensive, the frequency response of the transformer can be appreciably improved particularly in the higher frequency band and noise current and other unbalanced current can also be greatly suppressed.

Hence, this invention will contribute greatly to improvements not only in television transmission lines but also in measuring apparatuses of ordinary electrical circuits. Moreover this invention can also be applied to power transmission.

It will be apparent that many modifications and variations may be effected without departing from the scope of the novel concepts of this invention.

What is claimed is:

1. A transformer comprising a primary winding one terminal of which is connected to one input terminal and the other terminal of which is connected to one terminal of a load, a secondary winding electro-magnetically coupled with said primary winding and one terminal of which is connected to the other input terminal and the other terminal of which is connected to the other terminal of said load, a tertiary winding which is electro-magnetically coupled with both said primary and said secondary winding and an impedance terminated across the terminals of said tertiary winding, thereby suppressing noise currents generated by external sources in a transmission line connected to the aforesaid input terminals without substantially affecting the signal currents transmitted along said transmission line.

2. A transformer as claimed in claim 1, wherein a transmission cable is solenoidally wound as said primary and secondary windings and said tertiary winding is wound so as to be electromagnetically coupled with said primary and secondary windings therearound.

3. A noise suppression transformer device comprising a main transformer consisting of a primary winding and a secondary winding and a noise suppression transformer having a primary winding one terminal of which is connected to one input terminal, the other terminal of which is connected to one terminal of said primary winding of said main transformer, a secondary winding which is electromagnetically coupled with said primary winding of said noise suppression transformer and one terminal of said secondary winding of said noise suppression transformer being connected to the other input terminal, the other terminal of which is connected to the second terminal of said primary winding of said main transformer and a tertiary winding which is electromagnetically coupled with said primary and secondary windings of said noise suppression transformer, said tertiary winding terminated with an impedance.

References Cited by the Examiner

UNITED STATES PATENTS

| | | | |
|---|---|---|---|
| 2,553,324 | 5/1951 | Lord | 333—25 X |
| 2,728,818 | 12/1955 | Mackey et al. | 333—25 X |
| 3,114,120 | 12/1963 | Heck | 333—25 |

LLOYD McCOLLUM, *Primary Examiner.*

ROBERT L. SIMS, *Examiner.*